(12) United States Patent
Arakawa et al.

(10) Patent No.: US 8,445,571 B2
(45) Date of Patent: May 21, 2013

(54) PROCESSING AGENT FOR POLYURETHANE ELASTOMER FIBERS

(75) Inventors: Yasunobu Arakawa, Gamagori (JP); Jun Ito, Gamagori (JP)

(73) Assignee: Takemoto Yushi Kabushiki Kaisha, Gamagori-shi, Aichi-ken (JP)

( * ) Notice: Subject to any disclaimer, the term of this patent is extended or adjusted under 35 U.S.C. 154(b) by 0 days.

(21) Appl. No.: 13/042,727

(22) Filed: Mar. 8, 2011

(65) Prior Publication Data

US 2012/0004352 A1   Jan. 5, 2012

(30) Foreign Application Priority Data

Jun. 30, 2010   (JP) .................................. 2010-148514

(51) Int. Cl.
*D06M 13/325* (2006.01)
*C08K 5/16* (2006.01)

(52) U.S. Cl.
USPC .......................................... 524/198; 252/8.84

(58) Field of Classification Search
USPC .......................................... 524/198; 252/8.84
See application file for complete search history.

(56) References Cited

U.S. PATENT DOCUMENTS

| 3,136,830 | A | * | 6/1964 | Oertel et al. | .................. | 264/184 |
| 3,482,010 | A | * | 12/1969 | Yasui et al. | .................. | 264/130 |
| 7,615,592 | B2 | * | 11/2009 | Sagawa et al. | ................ | 524/507 |

FOREIGN PATENT DOCUMENTS

JP   2004-092011   *   3/2004

OTHER PUBLICATIONS

Machine translation of JP 2004-092011. Mar. 2004.*

* cited by examiner

*Primary Examiner* — John Uselding
(74) *Attorney, Agent, or Firm* — Weaver Austin Villeneuve & Sampson LLP

(57) ABSTRACT

A processing agent for polyurethane elastomer fibers contains a specified type of dispersion medium having a mineral oil as its essential component in an amount of 80-99.99 mass % and a dispersoid of a specified type made of urethane compound in an amount of 0.01-20 mass % for a total of 100 mass %, having its average particle diameter adjusted to 0.01-500 μm as measured by a specified method such that packages with superior roll shape and unwinding property can be obtained.

6 Claims, No Drawings

PROCESSING AGENT FOR POLYURETHANE ELASTOMER FIBERS

Priority is claimed on Japanese Patent Application 2010-148514 filed Jun. 30, 2010.

BACKGROUND OF THE INVENTION

This invention relates to agents for processing polyurethane elastomer fibers and methods of processing polyurethane elastomer fibers by using such agents, as well as polyurethane elastomer fibers obtained by such methods. More specifically, this invention relates to agents for processing polyurethane elastomer fibers capable of providing packages having improved roll shapes and unwinding property at the time of the production of polyurethane elastomer fibers and of providing polyurethane elastomer fibers with superior smoothness, antistatic property and hot melt adhesive property.

As agents for processing polyurethane elastomer fibers, there have conventionally been known those obtained by dispersing solid metallic soap in polydimethyl siloxane or a mineral oil (such as disclosed in Japanese Patent Publications Tokko 41-286, Tokko 40-5557 and Tokkai 9-217283), those containing polyoxyalkylene ether modified polysiloxane (such as disclosed in Japanese Patent Publications Tokkai 9-268477 and Tokkai 9-296377), and those containing polypropylene glycol polyol (such as disclosed in Japanese Patent Publication Tokkai 2000-327224). These conventional processing agents for polyurethane elastomer fibers were unsatisfactory, involving some serious problems in the production or fabrication of polyurethane elastomer fibers such as inferior unwinding property of the packages fabricated by the production of polyurethane elastomer fibers, inferior hot melt adhesive property on polyurethane elastomer fibers or insufficient smoothness or antistatic property provided to polyurethane elastomer fibers such that stable workability cannot be obtained.

SUMMARY OF THE INVENTION

It is therefore an object of this invention to provide agents for processing polyurethane elastomer fibers capable of providing packaged having improved roll shapes and unwinding property at the time of the production of polyurethane elastomer fibers and of providing polyurethane elastomer fibers with superior smoothness, antistatic property and hot melt adhesive property.

The present invention was accomplished by the inventors herein as a result of their diligent work in view of the aforementioned object of the invention and is based on their discovery that processing agents for polyurethane elastomer fibers having a dispersoid of a special kind dispersed in a dispersion medium of a special kind are correctly suitable,

DETAILED DESCRIPTION OF THE INVENTION

This is invention relates to agents for processing polyurethane elastomer fibers characterized as comprising a dispersion medium and a dispersoid of special types described below, containing this dispersion medium in an amount of 80-99.99 mass % and this dispersoid in an amount of 0.01-20 mass % such that their total would be 100 mass %, and being prepared such that its average particle size as measured by a specified measurement method is 0.01-500 μm, wherein the dispersion medium of the specified type is a liquid containing mineral oil in an amount of 70-100 mass % and silicone oil and/or liquid ester oil in an amount of 0-30 mass % such that the total would be 100 mass % and having a viscosity at 25° C. in the range of $2\times10^{-6}$-$1000\times10^{-6}$ m$^2$/s, the dispersoid is a urethane compound shown below by Formula (1):

Formula (1)

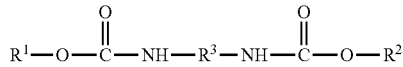

and is not determined to be a liquid at 25° C. by a specified determination method, $R^1$ and $R^2$ being each alkyl group with 8-50 carbon atoms or alkenyl group with 8-50 carbon atoms, $R^3$ being residual group obtained by removing all isocyanate groups from 4,4'-diphenylmethane diisocyanate, hydrogenated diphenylmethane diisocyanate, naphthalene diisocyanate, tolylene diisocyanate or hexamethylene diisocyanate, the specified determination method comprising the steps of filling a vertically maintained cylindrical glass test tube with inner diameter 30 mm and height 120 mm and having a flat bottom with the urethane compound to be height of 55 mm from the bottom inside an isothermal chamber at 25° C. and determining the urethane compound to be a liquid if it takes 90 seconds or less for the front of the moving edge of the urethane compound to pass a point 85 mm from the bottom of the test tube when the test tube is made horizontal, and the specified measurement method comprising the steps of diluting the processing agent for polyurethane elastomer fibers by using a mixture of polydimethyl siloxane and a mineral oil, both with viscosity of $10\times10^{-6}$ m$^2$/s at 25° C. at mass ratio of 1/1, to obtain a diluted liquid in which the dispersoid concentration of the processing agent for polyurethane elastomer fibers becomes 1000 mg/L and measuring volume standard average particle diameter by using this diluted liquid with a laser diffraction particles size analyzer at liquid temperature of 25° C.

This invention also relates to a method of processing polyurethane elastomer fibers characterized as comprising the step of causing a processing agent of this invention for polyurethane elastomer fibers to become adhered to polyurethane elastomer fibers at a rate of 0.1-10 mass % by a neat oiling method without diluting during a spinning step for the polyurethane elastomer fibers.

This invention further relates to polyurethane elastomer fibers obtained by the aforementioned method of processing polyurethane elastomer fibers.

Agents for processing polyurethane elastomer fibers according to this invention (hereinafter referred to as the processing agents of this invention) are explained first. The processing agents of this invention are for being made to adhere to polyurethane elastomer fibers at the time of their production, comprising a dispersion medium of a specified type and a dispersoid of a specified type.

The dispersion medium used for producing a processing agent of this invention is a liquid containing mineral oil in an amount of 70-100 mass % and silicone oil and/or liquid ester oil in an amount of 0-30 mass % such that their total would be 100 mass % and having viscosity at 25° C. in the range of $2\times10^{-6}$-$1000\times10^{-6}$ m$^2$/s.

Use as the mineral oil may be made of a general petroleum fraction containing paraffin component, naphthene component and aromatic component and there is no limitation regarding these components.

Examples of silicone oil that may be used include polydimethyl siloxane having dimethyl siloxane unit as constituent unit, polydimethyl siloxane having dimethyl siloxane unit and dialkyl siloxane unit with 2-4 carbon atoms as constituent unit, and polysiloxane having dimethyl siloxane unit and methylphenyl siloxane unit as constituent unit, but polydimethyl siloxane is preferred.

Examples of liquid ester oil include (1) esters of aliphatic monohydric alcohol and aliphatic monocarboxylic acid such as butyl stearate, octyl stearate, oleyl laurate, oleyl oleyate, isotridecyl stearate, and isopentacosanyl isostearate; (2) esters of aliphatic polyhydric alcohol and aliphatic monocarboxylic acid such as 1,6-hexane diol didecanoate, trimethylol propane monooleate monolaurate, trimethylol propane trilaurate, sorbitan monooleate, sorbitan trioleate, and natural oils and fats such as castor oil; and (3) esters of aliphatic monohydric alcohol and aliphatic polycarboxylic acid such as dilauryladipate, dioleylazelate, and trioctyl trimeritate, but esters of aliphatic monohydric alcohol and aliphatic monocarboxylic acid with 15-44 carbon atoms such as octyl stearate and isotridecyl stearate and esters of aliphatic polyhydric alcohol such as natural oils and fats and aliphatic monocarboxylic acid with 15-44 carbons atoms such as trimethylol propane trilaurate and castor oil are preferred.

Such dispersion media are characterized as comprising mineral oil in an amount of 70-100 mass % and silicone oil and/or liquid ester oil in an amount of 0-30 mass % such that the total would be 100 mass %, but those comprising mineral oil in an amount of 85-100 mass % and silicone oil and/or liquid ester oil in an amount of 0-15 mass % such that the total would be 100 mass % are preferred and those comprising mineral oil in an amount of 100 mass % are particularly preferable. If mineral oil is contained in an amount of less than 70 mass %, the hot melt adhesive property of the obtained polyurethane elastomer fibers is significantly inferior.

The dispersion media are a liquid having viscosity at 25° C. in the range of $2\times10^{-6}$-$1000\times10^{-6}$ m$^2$/s but those having viscosity at 25° C. in the range of $2\times10^{-6}$-$100\times10^{-6}$ m$^2$/s are preferable. If the viscosity at 25° C. is less than $2\times10^{-6}$ m$^2$/s, such a processing agent tends to scatter around when it is being applied to polyurethane elastomer fibers. If the viscosity at 25° C. is in excess of $1000\times10^{-6}$ m$^2$/s, on the other hand, it becomes difficult to obtain desired smoothness even if such a processing agent is applied to polyurethane elastomer fibers. In the above, the viscosity is to be represented by values obtained by measurements using a Cannon-Fenske viscometer as described in JIS-K2283 (kinematic viscosity test method for petroleum product).

The dispersoid to be used according to this invention is a urethane compound shown in Formula (1) which is not determined to be a liquid at 25° C. by the determination method specified above. This specified determination method is according to the liquid confirmation test of the Fire Service Law citing Article 69-2 related to regulations on dangerous objects, and urethane compounds not determined to be a liquid according to this specified determination method may be considered according to the idea commonly accepted in the world as being a solid compound.

$R^1$ and $R^2$ in Formula (1) are each alkyl group with 8-50 carbon atoms or alkenyl group with 8-50 carbon atoms. Examples of such alkyl group include straight chain and branched alkyl groups such as octyl group, nonyl group, decyl group, undecyl group, dodecyl group, tridecyl group, tetradecyl group, pentadecyl group. hexadecyl group, heptadecyl group, octadecyl group, nonadecyl group, icosyl group, henicosyl group, decosyl group, tricosyl group, tetracosyl group, pentacosyl group, hexacosuyl group, heptacosyl group, octacosyl group, nonacocyl group, triacontyls group, hentriacontyl group, dotriacontyl group, tritriacontyl group, tetratriacontyl group, heptatriacontyl group, octatriacontyl group, nonatriacontyl group, tetacontyl group, hentetracontyl group, isotetracosyl group, isopentacosyl group, isohexacosyl group, isoheptacosyl group, isooctacosyl group, isononacosyl group, isotriacontyl group, isohentriacontyl group, isotritriacontyl group, isotetratriacontyl group, and isoheptatriacontyl group, and examples of alkenyl group include straight-chain and branched alkenyl groups such as cis-8-tetratriacontenyl group and cis-4,8-ethyl-triacontenyl group. Out of these, alkyl groups with 14-38 carbon atoms and alkenyl groups with 14-38 carbon atoms are preferable as $R^1$ and $R^2$, and alkyl groups with 18-32 carbon atoms are further preferable.

$R^3$ in Formula (1) is a residual group obtained by removing all isocyanate groups from 4,4'-diphenylmethane diisocyanate, hydrogenated diphenylmethane diisocyanate, naphthalene diisocyanate, tolylene diisocyanate or hexamethylene diisocyanate. Out of these, residual groups obtained by removing all isocyanate groups from 4,4'-diphenylmethane diisocyanate, naphthalene diisocyanate, or tolylene diisocyanate are preferable.

Examples of such urethane compound shown by Formula (1) include 4,4'-diphenylmethane-bis(decylcarbamate), 4,4'-diphenylmethane-bis(dodecylcarbamate), 4,4'-diphenylmethane-bis(tetradecylcarbamate), 4,4'-diphenylmethane-bis(hexadecylcarbamate), 4,4'-diphenylmethane-bis(octadecylcarbamate), 4,4'-diphenylmethane-bis(nonadecylcarbamate), 4,4'-diphenylmethane-bis(icosylcarbamate), 4,4'-diphenylmethane-bis(docosylcarbamate), 4,4'-diphenylmethane-bis(tricosylcarbamate), 4,4'-diphenylmethane-bis(tetracosylcarbamate), 4,4'-diphenylmethane-bis(hexacosylcarbamate), 4,4'-diphenylmethane-bis(octacosylcarbamate), 4,4'-diphenylmethane-bis(triacontylcarbamate), 4,4'-diphenylmethane-bis(hentriacontylcarbamate), 4,4'-diphenylmethane-bis(dotriacontylcarbamate), 4,4'-diphenylmethane-bis(tetratriacontorylcarbamate), 4,4'-diphenylmethane-bis(hexatriacontylcarbamate), 4,4'-diphenylmethane-bis(tetracontylcarbamate), 4,4'-diphenylmethane-bis(dotetracontylcarbamate), didecyl tolylene dicarbamate, decyl (tetratriacontyl) tolylene dicarbamate, decyl (dotetracontyl) tolylene dicarbamate, dihexadecyl tolylene dicarbamate, dioctadecyl tolylene dicarbamate, dinonadecyl tolylene dicarbamate, diicosyl tolylene dicarbamate, didocosyl tolylene dicarbamate, ditracosyl tolylene dicarbamate, dihexacosyl tolylene dicarbamate, dioctacosyl tolylene dicarbamate, dinonacosyl tolylene dicarbamate, ditriacontyl tolylene dicarbamate, dihentriacontyl tolylene dicarbamate, didotriacontyl tolylene dicarbamate, ditritriacontyl tolylene dicarbamate, ditetratriacontyl tolylene dicarbamate, dioctatriacontyl tolylene dicarbamate, ditetracontyl tolylene dicarbamate, didotetracontyl tolylene dicarbamate, didecyl naphthalene dicarbamate, dihexadecyl naphthalene dicarbamate, hexadecyl (tetratriacontyl) naphthalene dicarbamate, dioctadecyl naphthalene dicarbamate, diicosyl naphthalene dicarbamate, dihenicosyl naphthalene dicarbamate, didocosyl naphthalene dicarbamate, ditetracosyl naphthalene dicarbamate, dihexacosyl naphthalene dicarbamate, diocotadecyl naphthalene dicarbamate, ditriacontyl naphthalene dicarbamate, dihentriacontyl naphthalene dicarbamate, didotriacontyl naphthalene dicarbamate, ditetratriacontyl naphthalene dicarbamate, dihexatriacontyl naphthalene dicarbamate, ditetracontyl naphthalene dicarbamate, didotetracontyl naphthalene dicarbamate, ditetratetracontyl naphthalene dicarbamate, diisotriacontyl naphthalene dicarbamate, cis-4,8- ethyl-triacontenyl naphthalene dicarbamate, hydrogenated diphenylmethane-bis(octacosylcarbamate), hydrogenated diphenylmethane-bis(triacontylcarbamate, hydrogenated diphenylmethane-bis(hentriacontylcarbamate), hydrogenated diphenylmethane-bis(dotriaconotylcarbamate), hydrogenated diphenylmethane-bis(tetratriacontylcarbamate), hydrogenated diphenylmethane-bis(dotetracontylcarbamate), hydrogenated diphenylmethane-bis(hexatetracontylcarbamate), hydrogenated diphenylmethane-bis(cis-8-tetratriacontylcarbamate), didocosyl hexamethylene dicarbamate, ditetracosyl hexamethylene dicarbamate, dihexacosyl hexamethylene dicarbamate, dioctacosyl hexamethylene dicarbamate, ditriacontyl hexamethylene dicarbamate, ditetratriacontyl hexamethylene dicarbamate, dioctatriacontyl hexamethylene dicarbamate, ditetracontyl hexamethylene dicarbamate, tetracontyl (hexatetracontyl) hexamethylene dicarbamate, and dihexatetracontyl hexamethylene dicarbamate.

Among the above, 4,4'-diphenylmethane-bis(tetradecylcarbamate), 4,4'-diphenylmethane-bis(hexadecylcarbamate), 4,4'-diphenylmethane-bis(octadecylcarbamate), 4,4'-diphenylmethane-bis(nonadecylcarbamate), 4,4'-diphenylmethane-bis(icosylcarbamate), 4,4'-diphenylmethane-bis(docosylcarbamate), 4,4'-diphenylmethane-bis(tricosylcarbamate), 4,4'-diphenylmethane-bis(tetracosylcarbamate), 4,4'-diphenylmethane-bis(hexacosylcarbamate), 4,4'-diphenylmethane-bis(octacosylcarbamate), 4,4'-diphenylmethane-bis(triacontylcarbamate), 4,4'-diphenylmethane-bis(hentriacontylcarbamate), 4,4'-diphenylmethane-bis(dotriacontylcarbamate), 4,4'-diphenylmethane-bis(tetratriacontorylcarbamate), 4,4'-diphenylmethane-bis(hexatriacontylcarbamate), dihexadecyl tolylene dicarbamate, dioctadecyl tolylene dicarbamate, dinonadecyl tolylene dicarbamate, diicosyl tolylene dicarbamate, didocosyl tolylene dicarbamate, ditetracosyl tolylene dicarbamate, dihexacosyl tolylene dicarbamate, dioctacosyl tolylene dicarbamate, dinonacosyl tolylene dicarbamate, ditriacontyl tolylene dicarbamate, dihentriacontyl tolylene dicarbamate, didotriacontyl tolylene dicarbamate, ditritriacontyl tolylene dicarbamate, ditetratriacontyl tolylene dicarbamate, dioctatriacontyl tolylene dicarbamate, dihexadecyl naphthalene dicarbamate, hexadecyl (tetratriacontyl) naphthalene dicarbamate, dioctadecyl naphthalene dicarbamate, diicosyl naphthalene dicarbamate, dihenicosyl naphthalene dicarbamate, didocosyl naphthalene dicarbamate, ditetracosyl naphthalene dicarbamate, dihexacosyl naphthalene dicarbamate, diocotadecyl naphthalene dicarbamate, ditriacontyl naphthalene dicarbamate, dihentriacontyl naphthalene dicarbamate, didotriacontyl naphthalene dicarbamate, ditetratriacontyl naphthalene dicarbamate, dihexatriacontyl naphthalene dicarbamate, and diisotriacontyl naphthalene dicarbamate, cis-4,8-ethyl-triacontenyl naphthalene dicarbamate are preferable as urethane compound shown by Formula (1), and 4,4'-diphenylmethane-bis(octadecylcarbamate), 4,4'-diphenylmethane-bis(nonadecylcarbamate), 4,4'-diphenylmethane-bis(icosylcarbamate), 4,4'-diphenylmethane-bis(docosylcarbamate), 4,4'-diphenylmethane-bis(tricosylcarbamate), 4,4'-diphenylmethane-bis(tetracosylcarbamate), 4,4'-diphenylmethane-bis(hexacosylcarbamate), 4,4'-diphenylmethane-bis(octacosylcarbamate), 4,4'-diphenylmethane-bis(triacontylcarbamate), 4,4'-diphenylmethane-bis(hentriacontylcarbamate), 4,4'-diphenylmethane-bis(dotriacontylcarbamate), dioctadecyl tolylene dicarbamate, dinonadecyl tolylene dicarbamate, diicosyl tolylene dicarbamate, didocosyl tolylene dicarbamate, ditetracosyl tolylene dicarbamate, dihexacosyl tolylene dicarbamate, dioctacosyl tolylene dicarbamate, dinonacosyl tolylene dicarbamate, ditriacontyl tolylene dicarbamate, dihentriacontyl tolylene dicarbamate, didotriacontyl tolylene dicarbamate, dioctadecyl naphthalene dicarbamate, diicosyl naphthalene dicarbamate, dihenicosyl naphthalene dicarbamate, didocosyl naphthalene dicarbamate, ditetracosyl naphthalene dicarbamate, dihexacosyl naphthalene dicarbamate, diocotadecyl naphthalene dicarbamate, ditriacontyl naphthalene dicarbamate, dihentriacontyl naphthalene dicarbamate, didotriacontyl naphthalene dicarbamate, and diisotriacontyl naphthalene dicarbamate are even more preferable.

The dispersion media to be used for the processing agents of this invention are urethane compounds shown by Formula (1), as explained above, and not determined to be in a liquid state at 25° C. by the method of measurement described above. Such urethane compounds contribute to the dispersion stability of the processing agents of this invention, demonstrating superior storage stability.

The processing agents of this invention contain a dispersion medium in an amount of 80-99.99 mass % and a dispersoid in an amount of 0.01-20 mass % such that the total would be 100 mass %, as explained above, but those containing a dispersion medium in an amount of 90-99.9 mass % and a dispersoid in an amount of 0.1-10 mass % such that the total would be 100 mass % are preferable. By causing the dispersion medium to be contained in an amount of 80-99.99 mass % and the dispersoid in an amount of 0.01-20 mass % such that the total would be 100 mass %, thixotropy of the processing agent can be appropriately controlled and superior storage stability can be obtained.

The processing agents of this invention comprises a dispersion medium and a dispersoid, as described above, containing the dispersion medium in an amount of 80-99.99 mass % and the dispersoid in an amount of 0.01-20 mass % such that the total would be 100 mass %, the average particle size being further prepared in the range of 0.01-500 μm, and preferably in the range of 0.1-100 μm. In the above, the average particle size is the value obtained when the processing agent for polyurethane elastomer fibers is diluted by using a liquid mixture of polydimethyl siloxane and mineral oil both having viscosity at 25° C. of $10\times10^{-6}$ m$^2$/s at the mass ratio of 1/1 such that the concentration of the dispersoid in this processing agent for polyurethane elastomer fibers would be 1000 mg/L and this diluted liquid is used with a laser diffraction particle size analyzer to measure the volume standard average particle diameter.

The processing agent of this invention can be prepared by a known method. It can be obtained as a uniform dispersion liquid, for example, by mixing a dispersion medium and a dispersoid at a specified ratio to obtain a mixture and then using this mixture with a grinder such as a vertical bead mill, a horizontal bead mill, a sand grinder and a colloid mill. The temperature at the time of mixing the ingredients and wet grinding is preferably set at 20-35° C. The viscosity of the dispersion liquid is preferable set in the range of $2\times10^{-6}$-$1000\times10^{-6}$ m$^2$/s and more preferably $2\times10^{-6}$-$100\times10^{-6}$ m$^2$/s as measured at 25° C. by using a Cannon-Fenske viscometer described in JIS-K2283 (kinematic viscosity test method for petroleum product).

The processing agent of this invention may also include ingredients such as modified silicone oils, silicone resins, anion surfactants, nonion surfactants, cation surfactants, amphoteric surfactants, binders, antistatic agents and wetting agents appropriately whenever necessary within the range of not adversely affecting the desired effects of this invention. Examples of aforementioned modified silicone oils include amino modified polydimethyl siloxane and polyether modified polydimethyl siloxane. Examples of aforementioned binders include fatty alcohols. It is preferable to contain such ingredients as little as possible such as in an amount less than 10 mass parts per 100 mass parts of the processing agent of this invention.

Next, a method of processing polyurethane elastomer fibers according to this invention (hereinafter referred to as the processing method of this invention) is explained. The processing method of this invention is characterized as using a processing agent of this invention as described above without diluting in the spinning step of polyurethane elastomer fibers and applying it to the polyurethane elastomer fibers at a rate of 0.1-10 mass % by the neat oiling method.

According to the processing method of this invention, the processing agent of this invention is not diluted with a solvent or the like but is directly applied to polyurethane elastomer fibers by the neat oiling method. The application is carried out in the step of spinning the polyurethane elastomer fibers. Known methods of application such as the roller oiling method, the guide oiling method and the spray oiling method can be used. The amount of the processing agent of this invention to be applied is 0.1-10 mass %, or preferably 2-6 mass %, of the polyurethane elastomer fibers.

Lastly, polyurethane elastomer fibers of this invention are explained. Polyurethane elastomer fibers according to this invention are fibers characterized as being obtained by the processing method of this invention described above.

In the present invention, polyurethane elastomer fibers normally mean elastomer fibers having polyurethane as the principal component and spun from long-chain polymers containing segmented polyurethane in an amount of 85 mass % or more.

Long-chain polymers include so-called soft segments and hard segments. Soft segments are relatively long-chain segments such as polyethers, polyesters and polyetheresters, and hard segments are relatively short-chain segments derived by a reaction of isocyanate with diamine or a diol cross linker. Such long-chain polymers are usually produced by capping the soft segment precursor at the hydroxyl end with organic diisocyanate to generate prepolymer and elongating chain of this prepolymer with diamine or diol.

Regarding soft segments, examples of polyether include those derived from tetramethylene glycol, 3-methyl-1,5-pentanediol, tetrahydrofuran, and 3-methyltetrahydrofuran, but those derived from tetramethylene glycol and preferable. Examples of aforementioned polyesters include those derived from ethylene glycol, tetramethylene glycol and, 2,2-dimethyl-1,3-propanediol and a dibasic acid such as adipic acid and succinic acid. Examples of aforementioned polyetheresters include those derived from polyether and polyester.

Examples of aforementioned organic diisocyanate used for capping soft segment precursor include bis-(p-isocyanatephenyl)-methane (MDI), tolylenediisocyanate (TDI), bis-(4-isocyanate cyclohexyl)-methane (PICM), hexamethylene diisocyanate, and 3,3,5-trimethyl-5-methylene cyclohexyl diisocyanate, but MDI is preferable.

Examples of aforementioned diamine used for chain elongation of prepolymer include ethylene diamine, 1,3-cyclohexane diamine, and 1,4-cyclohexane diamine.

Examples of aforementioned diol used for chain elongation of prepolymer include ethylene glycol, 1,3-propane diol, 4-butane diol, neopentyl glycol, 1,2-propylene glycol, 1,4-cyclohexane dimethanol, 1,4-cyclohexane diol, 1,4-bis(β-hydroxethyl) terephthalate and paraxylene diol. Although long chain polymers to be materials for polyurethane elastomer fibers have been explained above, there is no particular limitation on the method of polymerizing such long chain polymers.

Such long chain polymers to be materials for polyurethane elastomer fibers may contain ultraviolet light absorbers such as benzotriazole type, weather-proofing agents such as hindered amine type, antioxidants such as hindered phenol type, pigments of various types such as titanium oxide and iron oxide, and functional additives such as barium sulfate, zinc oxide, cesium oxide and silver ions.

Examples of solvent to be used for spinning polyurethane elastomer fibers by using long chain polymers as materials include N,N-dimethylacetamide (DMAc), dimethyl formamide, dimethyl sulfoxide, N-methylpyrrolidone, but DMAc is preferable. For the dry spinning method using a solvent, the concentration of long chain polymers is preferable 30-40 mass %, and more preferably 35-38 mass %, with respect to the total mass of the solution.

Polyurethane elastomer fibers are usually spun by the melt spinning method, the dry spinning method or the wet spinning method when diol is used as the cross linker and by the dry spinning method when diamine is used as the cross linker. Although the present invention does not impose any particular limitation on the method of spinning, the dry spinning method using a solvent is preferable.

By the present method as described above, it is possible to obtain packages with superior roll shape and unwinding property in the production of polyurethane elastomer fibers and to provide improved smoothness, antistatic property and hot melt adhesive property to polyurethane elastomer fibers such that, as a result, polyurethane elastomer fibers with high quality can be obtained with stable workability.

EXAMPLES

In what follows, the invention is described by way of examples in order to make its structure and effects clearer but these examples are not intended to limit the scope of the invention. In the following, "part" will mean "mass part" and "%" will means "mass %".

Part 1 (Preparation of Dispersion Media)
Preparation of Urethane Compound Shown by Formula (1) (UT-1)

After 4,4'-diphenyl methane diisocyanate 250.27 g and hentriacontanol 905.02 g were placed in a reactor, the temperature was raised to 190° C. in a nitrogen atmosphere and the contents were uniformly dissolved, and urethane forming reaction was carried out by adding dibutyl tin dilaurate 0.15 g. After the reaction ended and the content was once cooled and solidified, it was roughly ground by means of a ball mill to obtain urethane compound (UT-1). It was a urethane compound not to be determined as a liquid at 25° C. by the determination method specified above (in the form of a solid according to the idea commonly accepted in the world).

Preparation of Urethane Compounds Shown by Formula (1) (UT-2)-(UT-4), (UT-6)-(UT-9), (UT-12)-(UT-15) and (UT-18)-(UT-21) and Urethane Compound (UT-2) for Comparison Similarly to the preparation of urethane compound (UT-1), urethane compounds shown by Formula (1) (UT-2)-(UT-4), (UT-6)-(UT-9), (UT-12)-(UT-15) and (UT-18)-(UT-21) and urethane compound (ut-2) for comparison shown in Table 1 were prepared.

Preparation of Urethane Compound Shown by Formula (1) (UT-5)

After tolylene diisocyanate 174.16 g, tetracosanol 354.64 g and octacosanol 410.74 g were placed in a reactor, the temperature was raised to 190° C. in a nitrogen atmosphere and the contents were uniformly dissolved, urethane forming reaction was carried out by adding dibutyl tin dilaurate 0.15 g. After the reaction ended and the content was once cooled and solidified, it was roughly ground by means of a ball mill to obtain urethane compound (UT-5). It was a urethane compound not to be determined as a liquid at 25° C. by the determination method specified above (in the form of a solid according to the idea commonly accepted in the world).

Preparation of Urethane Compounds Shown by Formula (1) (UT-10), (UT-11), (UT-16), (UT-17) and (UT-22) and Urethane Compound (ut-3) for Comparison Similarly to the preparation of urethane compound (UT-5), urethane compounds shown by Formula (1) (UT-10), (UT-11), (UT-16), (UT-17) and (UT-22) and urethane compound (ut-3) for comparison shown in Table 1 were prepared.

Preparation of Urethane Compound (ut-1) for Comparison

After hydrogenated diphenylmethane diisocyanate 262.35 g and ethanol 92.14 g were placed in a reactor, the temperature was raised to 70° C. in a nitrogen atmosphere and the contents were uniformly dissolved, urethane forming reaction was carried out by adding dibutyl tin dilaurate 0.15 g to obtain urethane compound (ut-1). It was a urethane compound not to be determined as a liquid at 25° C. by the determination method specified above (in the form of a solid according to the idea commonly accepted in the world).

Preparation of Urethane Compound (ut-4) for Comparison

Similarly to the preparation of urethane compound (ut-1), urethane compound (ut-4) for comparison shown in Table 1 was prepared.

TABLE 1

| Type of dispersoid | $R^1$ | $R^2$ | $R^3$ | Condition at 25° C. |
|---|---|---|---|---|
| UT-1 | R-1 | R-1 | R-16 | solid |
| UT-2 | R-2 | R-2 | R-17 | solid |
| UT-3 | R-3 | R-3 | R-18 | solid |
| UT-4 | R-4 | R-4 | R-17 | solid |
| UT-5 | R-3 | R-4 | R-17 | solid |
| UT-6 | R-5 | R-5 | R-16 | solid |
| UT-7 | R-6 | R-6 | R-16 | solid |
| UT-8 | R-7 | R-7 | R-18 | solid |
| UT-9 | R-8 | R-8 | R-17 | solid |
| UT-10 | R-7 | R-5 | R-18 | solid |
| UT-11 | R-8 | R-4 | R-17 | solid |
| UT-12 | R-9 | R-9 | R-16 | solid |
| UT-13 | R-10 | R-10 | R-17 | solid |
| UT-14 | R-11 | R-11 | R-18 | solid |
| UT-15 | R-12 | R-12 | R-16 | solid |
| UT-16 | R-10 | R-12 | R-17 | solid |
| UT-17 | R-7 | R-12 | R-17 | solid |
| UT-18 | R-7 | R-7 | R-19 | solid |
| UT-19 | R-13 | R-13 | R-19 | solid |
| UT-20 | R-10 | R-10 | R-19 | solid |
| UT-21 | R-14 | R-14 | R-19 | solid |
| UT-22 | R-11 | R-14 | R-20 | solid |
| ut-1 | r-1 | r-1 | R-19 | liquid |
| ut-2 | r-2 | r-2 | R-20 | solid |
| ut-3 | R-15 | r-1 | R-16 | solid |
| ut-4 | r-3 | r-3 | R-19 | liquid |

In Table 1:
R-1: Residual group obtained by removing hydroxyl group from hentriacontanol (hentriacontyl group)
R-2: Residual group obtained by removing hydroxyl group from icosanol (icosyl group)
R-3: Residual group obtained by removing hydroxyl group from tetracosanol (tetracosyl group)
R-4: Residual group obtained by removing hydroxyl group from octacosanol (octacosyl group)
R-5: Residual group obtained by removing hydroxyl group from hexadecanol (hexadecyl group)
R-6: Residual group obtained by removing hydroxyl group from hexatriacontanol (hexatriacontyl group)
R-7: Residual group obtained by removing hydroxyl group from tetratriacontanol (tetratriacontyl group)
R-8: Residual group obtained by removing hydroxyl group from hexadecanol (hexadecyl group)
R-9: Residual group obtained by removing hydroxyl group from dodecanol (dodecyl group)
R-10: Residual group obtained by removing hydroxyl group from dotetracontanol (dotetracontyl group)
R-11: Residual group obtained by removing hydroxyl group from tetracontanol (tetracontyl group)
R-12: Residual group obtained by removing hydroxyl group from decanol (decyl group)
R-13: Residual group obtained by removing hydroxyl group from cis-8-tetratriacontenol (cis-8-tetratriacontenyl group)
R-14: Residual group obtained by removing hydroxyl group from hexatetracontanol (hexatetracontyl group)
R-15: Residual group obtained by removing hydroxyl group from octatriacontanol (octatriacontyl group)
R-16: Residual group obtained by removing all isocyanate groups from 4,4'-diphenylmethane diisocyanate
R-17: Residual group obtained by removing all isocyanate groups from tolylene diisocyanate
R-18: Residual group obtained by removing all isocyanate groups from naphthalene diisocyanate
R-19: Residual group obtained by removing all isocyanate groups from hydrogenated diphenylmethane diisocyanate
R-20: Residual group obtained by removing hydroxyl group from hexamethylene diisocyanate
r-1: Residual group obtained by removing hydroxyl group from ethanol (ethyl group)
r-2: Residual group obtained by removing hydroxyl group from dopentacontanol (dopentacontyl group)
r-3: Residual group obtained by removing hydroxyl group from 2-methyl-1-propanol (2-methyl-1-propyl group)
Solid: Not determined to be liquid at 25° C. by the specified determination method described above
Liquid: Determined to be liquid at 25° C. by the specified determination method described above Part 2 (Preparation of Processing Agents for Polyurethane Elastomer Fibers)

Test Example 1

Preparation of Processing Agent (T-1)

After mineral oil (a-1) with viscosity $20\times10^{-6}$ m$^2$/s at 25° C. as dispersion medium (99 parts) and urethane compound (UT-1) shown in Table 1 as dispersoid (1 part) were mixed together at 20-35° C. until they became uniform, a horizontal bead mill was used for wet grinding to prepare processing agent (T-1) as a uniform dispersion liquid with average particle diameter of 5 μm as measured by the aforementioned measurement method.

Test Examples 2-15 and 22-27 and Comparison Examples 2, 7 and 9-12

Preparation of Processing Agents (T-2)-(T-15) and (T-22)-(T-27) and Processing Agents for Comparison (t-2), (t-7) and (t-9)-(t-12)

Processing agents (T-2)-(T-15), (T-22)-(T-27), (t-2), (t-7) and (t-9)-(t-12) corresponding to Test Examples 2-15 and 22-27 in Table 2 and Comparison Examples 2, 7 and 9-12 shown in Table 3 were prepared similarly as explained above for processing agent (T-1) of Test Example 1.

Test Example 16

Preparation of Processing Agent (T-16)

After a mixture (98 parts) of mineral oil (a-1) with viscosity $20 \times 10^{-6}$ m$^2$/s at 25° C. (90 parts) and polydimethyl siloxane (b-1) with viscosity $20 \times 10^{-6}$ m$^2$/s at 25° C. (10 parts) as dispersion medium and urethane compound (UT-6) shown in Table 1 as dispersoid (2 parts) were mixed together at 20-35° C. until they became uniform, a horizontal bead mill was used for wet grinding to prepare processing agent (T-16) corresponding to Test Example 16 as a uniform dispersion liquid with average particle diameter of 10 μm as measured by the aforementioned measurement method.

Test Examples 18, 19, 21, 28, 30-35 and 43 and Comparison Examples 1, 3 and 4

Preparation of Processing Agents (T-18), (T-19), (T-21), (T-28), (T-30)-(T-35) and (T-43) and Processing Agents for Comparison (t-1), (t-3) and (t-4)

Processing agents (T-18), (T-19), (T-21), (T-28), (T-30)-(T-35), (T-43), (t-1), (t-3) and (t-4) corresponding to Test Examples 18, 19, 21, 28, 30-35 and 43 shown in Table 2 and Comparison Examples 1, 3 and 4 shown in Table 3 were prepared similarly as explained above for processing agent (T-16) of Test Example 16.

Test Example 17

Preparation of Processing Agent (T-17)

After a mixture (98 parts) of mineral oil (a-2) with viscosity $10 \times 10^{-6}$ m$^2$/s at 25° C. (90 parts), polydimethyl siloxane (b-2) with viscosity $10 \times 10^{-6}$ m$^2$/s at 25° C. (5 parts) and isotridecyl stearate (c-1) (5 parts) as dispersion medium and urethane compound (UT-7) shown in Table 1 as dispersoid (2 parts) were mixed together at 20-35° C. until they became uniform, a horizontal bead mill was used for wet grinding to prepare processing agent (T-17) corresponding to Test Example 17 as a uniform dispersion liquid with average particle diameter of 10 μm as measured by the aforementioned measurement method.

Test Examples 29, 36 and 42

Preparation of Processing agents (T-29), (T-36) and (T-42)

Processing agents (T-29), (T-36) and (T-42) corresponding to Test Examples 29, 36 and 42 shown in Table 2 were prepared similarly as explained above for processing agent (T-17) of Test Example 17.

Test Example 20

Preparation of Processing Agent (T-20)

After a mixture (99 parts) of mineral oil (a-3) with viscosity $10 \times 10^{-6}$ m$^2$/s at 25° C. (95 parts) and trimethylol propane laurate (c-2) (5 parts) as dispersion medium and urethane compound (UT-10) shown in Table 1 as dispersoid (1 part) were mixed together at 20-35° C. until they became uniform, a horizontal bead mill was used for wet grinding to prepare processing agent (T-20) corresponding to Test Example 20 as a uniform dispersion liquid with average particle diameter of 5 μm as measured by the aforementioned measurement method.

Test Examples 37, 38, 40 and 41

Preparation of Processing Agents (T-37), (T-38), (T-40) and (T-41)

Processing agents (T-37), (T-38), (T-40) and (T-41) corresponding to Test Examples 37, 38, 40 and 41 shown in Table 2 were prepared similarly as explained above for processing agent (T-20) of Test Example 20.

Test Example 39

Preparation of Processing Agent (T-39)

After a mixture (98 parts) of mineral oil (a-1) with viscosity $20 \times 10^{-6}$ m$^2$/s at 25° C. (80 parts) and polydimethyl siloxane (b-1) with viscosity $20 \times 10^{-6}$ m$^2$/s at 25° C. (20 parts) as dispersion medium and urethane compound (UT-13) shown in Table 1 as dispersoid (2 parts) were mixed together at 20-35° C. until they became uniform, a horizontal bead mill was used for wet grinding to prepare processing agent (T-39) corresponding to Test Example 39 as a uniform dispersion liquid with average particle diameter of 20 μm as measured by the aforementioned measurement method. At the time of its actual use, amino modified polydimethyl siloxane (1 part) with amino equivalent 2000 and viscosity 200 m$^2$/s at 25° C. was used together per 100 parts of processing agent (T-39) prepared as above.

Test Example 44

Preparation of Processing Agent (T-44)

After a mixture (98 parts) of mineral oil (a-2) with viscosity $10 \times 10^{-6}$ m$^2$/s at 25° C. (80 parts), polydimethyl siloxane (b-2) with viscosity $10 \times 10^{-6}$ m$^2$/s at 25° C. (10 parts) and isotridecyl stearate (c-1) (10 parts) as dispersion medium and urethane compound (UT-20) shown in Table 1 as dispersoid (2 parts) were mixed together at 20-35° C. until they became uniform, a horizontal bead mill was used for wet grinding to prepare processing agent (T-44) corresponding to Test Example 44 as a uniform dispersion liquid with average particle diameter of 50 μm as measured by the aforementioned measurement method. At the time of its actual use, silicone resin (2 parts) obtained by condensation polymerization of hexamethyl disiloxane and tetramethoxy silane at molar ratio of 1/2 was used together per 100 parts of processing agent (T-44) prepared as above.

Test Example 45

Preparation of Processing Agent (T-45)

After a mixture (88 parts) of mineral oil (a-7) with viscosity $200 \times 10^{-6}$ m$^2$/s at 25° C. (90 parts) and polydimethyl siloxane (b-2) with viscosity $10 \times 10^{-6}$ m$^2$/s at 25° C. (10 parts) as dispersion medium and urethane compound (UT-22) shown in Table 1 as dispersoid (12 parts) were mixed together at 20-35° C. until they became uniform, a horizontal bead mill was used for wet grinding to prepare processing agent (T-45) corresponding to Test Example 45 as a uniform dispersion liquid with average particle diameter of 50 μm as measured by the aforementioned measurement method. At the time of its actual use, polyether modified polydimethyl siloxane (1 part) obtained by formed with polydimethyl siloxane part and polyoxy alkylene group part at mass ratio of 90/10 and having the polyoxy alkylene group part structured with oxyethylene units and oxypropylene units at mass ratio of 75/25 was used together per 100 parts of processing agent (T-45) prepared as above.

Comparison Example 5

Preparation of Processing Agent (t-5)

Mixture of mineral oil (a-1) with viscosity $20 \times 10^{-6}$ m$^2$/s at 25° C. (98 parts) and urethane compound (ut-1) shown in Table 1 (2 parts) were used as processing agent (t-5) corresponding to Comparison Example 5.

Comparison Examples 6 and 13

Preparation of Processing Agents (t-6) and (t-13)

Processing agents (t-6) and (t-13) corresponding to Comparison Examples 6 and 13 in Table 3 were prepared similarly as explained above for processing agent (t-5) of Comparison Example 5.

Comparison Example 8

Preparation of Processing Agent (t-8)

Mineral oil (a-2) with viscosity $10 \times 10^{-6}$ m$^2$/s at 25° C. was used as processing agent (t-8) corresponding to Comparison Example 8.

Details of each of the processing agents prepared as above are shown together in Tables 2 and 3.

TABLE 2

Processing agent for polyurethane elastomer fibers

| | | Dispersion medium | | | | | | |
|---|---|---|---|---|---|---|---|---|
| | Type | Mineral oil Type/used amount (part) | Silicone oil Type/used amount (part) | Fluidic ester oil Type/used amount (part) | Viscosity ($\times 10^{-6}$ m$^2$/s) | Used amount (%) | Dispersoid Type/% | APD (μm) |
| TE-1 | T-1 | a-1/100 | — | — | 20 | 99 | UT-1/1 | 5 |
| TE-2 | T-2 | a-2/100 | — | — | 10 | 99 | UT-2/1 | 40 |
| TE-3 | T-3 | a-3/100 | — | — | 15 | 98 | UT-3/2 | 8 |
| TE-4 | T-4 | a-2/100 | — | — | 10 | 99.5 | UT-4/0.5 | 20 |
| TE-5 | T-5 | a-4/100 | — | — | 30 | 98 | UT-5/2 | 70 |
| TE-6 | T-6 | a-1/100 | — | — | 20 | 93 | UT-1/7 | 0.8 |
| TE-7 | T-7 | a-5/100 | — | — | 80 | 99 | UT-2/1 | 40 |
| TE-8 | T-8 | a-3/100 | — | — | 15 | 98 | UT-3/2 | 8 |
| TE-9 | T-9 | a-2/100 | — | — | 10 | 99.5 | UT-4/0.5 | 95 |
| TE-10 | T-10 | a-1/100 | — | — | 20 | 99 | UT-6/1 | 5 |
| TE-11 | T-11 | a-2/100 | — | — | 10 | 99 | UT-7/1 | 10 |
| TE-12 | T-12 | a-3/100 | — | — | 15 | 98 | UT-8/2 | 30 |
| TE-13 | T-13 | a-2/100 | — | — | 10 | 99.5 | UT-9/0.5 | 20 |
| TE-14 | T-14 | a-4/100 | — | — | 30 | 98 | UT-10/2 | 5 |
| TE-15 | T-15 | a-3/100 | — | — | 15 | 99 | UT-11/1 | 20 |
| TE-16 | T-16 | a-1/90 | b-1/10 | — | 20 | 98 | UT-6/2 | 10 |
| TE-17 | T-17 | a-2/90 | b-2/5 | c-1/5 | 10 | 98 | UT-7/2 | 10 |
| TE-18 | T-18 | a-3/95 | b-2/5 | — | 13 | 99 | UT-8/1 | 5 |
| TE-19 | T-19 | a-4/90 | b-2/10 | — | 25 | 98 | UT-9/2 | 20 |
| TE-20 | T-20 | a-3/95 | — | c-2/5 | 13 | 99 | UT-10/1 | 5 |
| TE-21 | T-21 | a-3/95 | b-2/5 | — | 13 | 99.5 | UT-11/0.5 | 50 |
| TE-22 | T-22 | a-1/100 | — | — | 20 | 98 | UT-12/2 | 70 |
| TE-23 | T-23 | a-3/100 | — | — | 15 | 98 | UT-13/2 | 5 |
| TE-24 | T-24 | a-2/100 | — | — | 10 | 99 | UT-14/1 | 1 |
| TE-25 | T-25 | a-4/100 | — | — | 30 | 98 | UT-15/2 | 20 |
| TE-26 | T-26 | a-2/100 | — | — | 10 | 98 | UT-16/2 | 50 |
| TE-27 | T-27 | a-2/100 | — | — | 10 | 98 | UT-17/2 | 50 |
| TE-28 | T-28 | a-1/90 | b-1/10 | — | 20 | 98 | UT-12/2 | 20 |
| TE-29 | T-29 | a-1/90 | b-1/5 | c-1/5 | 20 | 99.5 | UT-13/0.5 | 20 |
| TE-30 | T-30 | a-2/95 | b-2/5 | — | 10 | 98 | UT-14/2 | 5 |
| TE-31 | T-31 | a-1/90 | b-1/10 | — | 20 | 98 | UT-15/2 | 70 |
| TE-32 | T-32 | a-1/90 | b-1/10 | — | 20 | 98 | UT-16/2 | 20 |
| TE-33 | T-33 | a-1/90 | b-1/10 | — | 10 | 98 | UT-17/2 | 50 |
| TE-34 | T-34 | a-1/90 | b-1/10 | — | 10 | 98 | UT-18/2 | 50 |
| TE-35 | T-35 | a-1/90 | b-1/10 | — | 10 | 98 | UT-19/2 | 50 |
| TE-36 | T-36 | a-1/90 | b-1/5 | c-1/5 | 20 | 98 | UT-20/2 | 50 |
| TE-37 | T-37 | a-1/90 | — | c-1/10 | 20 | 99 | UT-12/1 | 200 |
| TE-38 | T-38 | a-1/90 | — | c-2/10 | 20 | 99 | UT-12/1 | 50 |
| TE-39 | T-39 | a-1/80 | b-1/20 | — | 20 | 98 | UT-13/2 | 20 |
| TE-40 | T-40 | a-1/95 | — | c-1/5 | 20 | 88 | UT-12/12 | 50 |
| TE-41 | T-41 | a-6/90 | — | c-2/10 | 300 | 99 | UT-12/1 | 50 |
| TE-42 | T-42 | a-2/90 | b-1/5 | c-2/5 | 10 | 98 | UT-21/2 | 300 |
| TE-43 | T-43 | a-6/90 | b-2/10 | — | 190 | 88 | UT-20/12 | 50 |
| TE-44 | T-44 | a-2/80 | b-2/10 | c-1/10 | 10 | 98 | UT-20/2 | 50 |
| TE-45 | T-45 | a-7/90 | b-2/10 | — | 190 | 88 | UT-22/12 | 50 |

TABLE 3

Processing agent for polyurethane elastomer fibers

| | Type | Dispersion medium Mineral oil Type/used amount (part) | Silicone oil Type/used amount (part) | Fluidic ester oil Type/used amount (part) | Viscosity ($\times 10^{-6}$ m$^2$/s) | Used amount (%) | Dispersoid Type/% | APD (μm) |
|---|---|---|---|---|---|---|---|---|
| CE-1  | t-1  | a-1/18  | b-1/80 | — | 20   | 98  | *1/2    | 2   |
| CE-2  | t-2  | a-1/99  | —      | — | 20   | 99  | *1/1    | 2   |
| CE-3  | t-3  | a-8/60  | b-2/40 | — | 140  | 70  | UT-14/30| 100 |
| CE-4  | t-4  | a-1/20  | b-1/80 | — | 20   | 98  | UT-2/2  | 10  |
| CE-5  | t-5  | a-1/100 | —      | — | 20   | 98  | ut-1/2  | —   |
| CE-6  | t-6  | a-1/100 | —      | — | 20   | 98  | ut-1/2  | —   |
| CE-7  | t-7  | a-9/100 | —      | — | 2000 | 70  | UT-4/30 | 5   |
| CE-8  | t-8  | a-2/100 | —      | — | 10   | 100 | —       | —   |
| CE-9  | t-9  | a-9/100 | —      | — | 2000 | 98  | UT-4/2  | 40  |
| CE-10 | t-10 | a-9/100 | —      | — | 2000 | 98  | ut-2/2  | 5   |
| CE-11 | t-11 | a-1/100 | —      | — | 20   | 98  | UT-9/2  | 600 |
| CE-12 | t-12 | a-1/100 | —      | — | 20   | 98  | ut-3/2  | 700 |
| CE-13 | t-13 | a-1/100 | —      | — | 20   | 98  | ut-4/2  | —   |

In Tables 2 and 3:
TE: Test Example
CE: Comparison Example
APD: Average particle diameter obtained by the measurement method described above in units of μm
a-1: Mineral oil with viscosity $20 \times 10^{-6}$ m$^2$/s at 25° C.
a-2: Mineral oil with viscosity $10 \times 10^{-6}$ m$^2$/s at 25° C.
a-3: Mineral oil with viscosity $15 \times 10^{-6}$ m$^2$/s at 25° C.
a-4: Mineral oil with viscosity $30 \times 10^{-6}$ m$^2$/s at 25° C.
a-5: Mineral oil with viscosity $80 \times 10^{-6}$ m$^2$/s at 25° C.
a-6: Mineral oil with viscosity $300 \times 10^{-6}$ m$^2$/s at 25°
a-7: Mineral oil with viscosity $200 \times 10^{-6}$ m$^2$/s at 25° C.
a-8: Mineral oil with viscosity $150 \times 10^{-6}$ m$^2$/s at 25° C.
a-9: Mineral oil with viscosity $2000 \times 10^{-6}$ m$^2$/s at 25° C.
b-1: Polydimethyl siloxane with viscosity $20 \times 10^{-6}$ m$^2$/s at 25° C.
b-2: Polydimethyl siloxane with viscosity $10 \times 10^{-6}$ m$^2$/s at 25° C.
c-1: Isotridecyl stearate
c-2: Trimethylol propane trilaurate
*1: Magnesium stearate Part 3 (Evaluation of Processing Agents for Polyurethane Elastomer Fibers)

Each of the processing agents prepared in Part 2 for polyurethane elastomer fibers was evaluated as follows regarding dispersion stability, average particle diameter and viscosity increase. The results are shown together in Tables 4 and 5.

Evaluation of Dispersion Stability

Processing agent 100 ml for polyurethane elastomer fibers of each example was placed inside a measuring glass cylinder equipped with a seal plug and was left for 6 months at 25° C. Their external view was observed both immediately after they were prepared and six months later and was evaluated as follows:

A: Uniformly dispersed and no changes in the external view
B: Transparent layer of less than 5 ml was generated
C: Transparent layer of 5 ml or more was generated
D: There were precipitations Evaluation of Average Particle Diameter Average particle diameter of each example of processing agents of which dispersion stability has been evaluated was measured both immediately after their preparation and six months later by the measurement method described above and was evaluated as follows:

D: The average particle diameter was less than 0.01 μm
B: The average particle diameter was 0.01 μm or greater and less than 0.1 μm
A: The average particle diameter was 0.1 μm or greater and less than 100 μm
B: The average particle diameter was over 100 μm and less than 500 μm
D: The average particle diameter was over 500 μm Evaluation of Viscosity Increase An E-type viscometer (DVH-E type (tradename) produced by Tokimec, Inc.) was used to measure the viscosity of each example of processing agents at 30° C. at rotor E, 20 rpm, the measured value being defined as the initial viscosity $V_1$ (Pa·s). Each example of processing agents was also placed inside a glass container equipped with a seal plug and left for 6 months at 40° C., and its viscosity at 30° C. was similarly measured again, the measured value being defined as the later viscosity $V_2$ (Pa·s). The ratio $V_2/V_1$ was calculated and evaluated as follows:

A: $V_2/V_1$ is less than 1.3
B: $V_2/V_1$ is 1.3 or greater and less than 1.5
C: $V_2/V_1$ is 1.5 or greater and less than 2.0
D: $V_2/V_1$ is 2.0 or greater

TABLE 4

Processing agent for urethane elastomer fibers

| | | Dispersion stability | | Average particle diameter | | |
|---|---|---|---|---|---|---|
| | Type | Immediately after | 6 months later | Immediately after | 6 months later | Viscosity increase |
| TE-1 | T-1 | A | A | A | A | A |
| TE-2 | T-2 | A | A | A | A | A |
| TE-3 | T-3 | A | A | A | A | A |
| TE-4 | T-4 | A | A | A | A | A |
| TE-5 | T-5 | A | A | A | A | A |

TABLE 4-continued

Processing agent for urethane elastomer fibers

| | | Dispersion stability | | Average particle diameter | | |
|---|---|---|---|---|---|---|
| | Type | Immediately after | 6 months later | Immediately after | 6 months later | Viscosity increase |
| TE-6 | T-6 | A | A | A | A | A |
| TE-7 | T-7 | A | A | A | A | A |
| TE-8 | T-8 | A | A | A | A | A |
| TE-9 | T-9 | A | A | A | A | A |
| TE-10 | T-10 | A | A | A | A | A |
| TE-11 | T-11 | A | A | A | A | A |
| TE-12 | T-12 | A | A | A | A | A |
| TE-13 | T-13 | A | A | A | A | A |
| TE-14 | T-14 | A | A | A | A | A |
| TE-15 | T-15 | A | A | A | A | A |
| TE-16 | T-16 | A | A | A | A | A |
| TE-17 | T-17 | A | A | A | A | A |
| TE-18 | T-18 | A | A | A | A | A |
| TE-19 | T-19 | A | A | A | A | A |
| TE-20 | T-20 | A | A | A | A | A |
| TE-21 | T-21 | A | A | A | A | A |
| TE-22 | T-22 | A | B | A | A | A |
| TE-23 | T-23 | A | B | A | A | A |
| TE-24 | T-24 | A | B | A | A | A |
| TE-25 | T-25 | A | B | A | A | A |
| TE-26 | T-26 | A | B | A | A | A |
| TE-27 | T-27 | A | B | A | A | A |
| TE-28 | T-28 | A | B | A | A | A |
| TE-29 | T-29 | A | B | A | A | A |
| TE-30 | T-30 | A | B | A | A | A |
| TE-31 | T-31 | A | B | A | A | A |
| TE-32 | T-32 | A | B | A | A | A |
| TE-33 | T-33 | A | B | A | A | A |
| TE-34 | T-34 | A | B | A | A | A |
| TE-35 | T-35 | A | B | A | A | A |
| TE-36 | T-36 | A | B | A | B | A |
| TE-37 | T-37 | A | B | B | B | A |
| TE-38 | T-38 | A | B | A | B | B |
| TE-39 | T-39 | A | B | A | B | B |
| TE-40 | T-40 | B | B | A | B | A |
| TE-41 | T-41 | A | B | A | B | B |
| TE-42 | T-42 | B | B | B | B | A |
| TE-43 | T-43 | B | B | A | B | B |
| TE-44 | T-44 | B | B | A | B | B |
| TE-45 | T-45 | B | B | A | B | B |

TABLE 5

Processing agent for urethane elastomer fibers

| | | Dispersion stability | | Average particle diameter | | |
|---|---|---|---|---|---|---|
| | Type | Immediately after | 6 months later | Immediately after | 6 months later | Viscosity increase |
| CE-1 | t-1 | B | B | A | B | C |
| CE-2 | t-2 | D | D | A | D | D |
| CE-3 | t-3 | B | B | A | B | B |
| CE-4 | t-4 | B | B | A | B | B |
| CE-5 | t-5 | *2 | *2 | *2 | *2 | A |
| CE-6 | t-6 | *2 | *2 | *2 | *2 | A |
| CE-7 | t-7 | A | B | A | B | B |
| CE-8 | t-8 | *2 | *2 | *2 | *2 | A |
| CE-9 | t-9 | A | B | A | A | B |
| CE-10 | t-10 | A | B | A | A | B |
| CE-11 | t-11 | C | D | D | D | C |
| CE-12 | t-12 | C | D | D | D | C |
| CE-13 | t-13 | *2 | *2 | *2 | *2 | A |

In Tables 4 and 5;
TE: Test Example
CE: Comparison Example
*2: Evaluation could not be made because they were not dispersion liquids.

As can be clearly understood from Tables 4 and 5, processing agents according to this invention maintain their initial characteristics over an extended period of time and superior in dispersion stability. Processing agents according to this invention are easy to use because they undergo hardly any changes in their characteristics during storage and transportation over a long period of time and maintain superior dispersion stability.

Part 4 Adhesion of Processing Agents on Polyurethane Elastomer Fibers and Evaluation Adhesion of Processing Agents on Polyurethane Elastomer Fibers After a mixture of bis-(p-isocyanate phenyl)-methane and tetramethylene ether glycol (number average molecular weight=1800) at molar ratio 1.58/1 was caused to react by a normal method at 90° C. for 3 hours to obtain urethane polymer terminated by glycols, this was diluted with N,N'-dimethylacetoamide (DMAc). Next, a solution of DMAc containing ethylene diamine and diethylamine was added to the aforementioned DMAc solution of urethane polymer terminated by glycols and a high-speed stirring machine was used at room temperature to obtain polymers by chain elongation. DMAc was further added to obtain a DMAc solution with the concentration of the aforementioned polymers about 35 mass %, and a uniform polymer mixed solution was obtained by adding titanium oxide, hindered amine type weather-proofing agent and hindered phenol type antioxidant to this DMAc solution of polymers in amounts respectively of 4.7 mass %, 3.0 mass % and 1.2 mass % with respect to the polymers. This polymer mixed solution was used to spin 560 dtex elastic yarns with filament count of 56 by a known dry type spinning method used for spandex and each of the processing agents was supplied by roller oiling method from an oiling roller before wound up in the neat condition. After the roller oiling, the fibers were wound by using a surface drive winding machine around a cylindrical paper tube with length 115 mm at winding speed of 500 m/minute through a traverse guide providing a wind-up width of 104 mm so as to obtain a package of polyurethane elastomer fibers by dry spinning. The adhered amount of processing agent was adjusted by varying the rotational speed of the oiling roller.

Measurement and Evaluation

The packages of polyurethane elastomer fibers obtained by dry spinning as above were measured and evaluated as follows, and the results are shown together in Tables 6 and 7.

Adhered amount of processing agent was measured by using the polyurethane elastomer fibers pulled out of the aforementioned packages (1 kg in winding) and n-hexane as extraction solvent according to JIS-L1073 (method of testing synthetic fiber filament yarn).

Evaluation of Roll Shape

Maximum and minimum values of the wound width ($W_{max}$ and $W_{min}$) were measured on the aforementioned package (1 kg in winding) and the bulge was obtained from their difference ($W_{max}-W_{min}$) and evaluated as follows:

A: Bulge was less than 4 mm
B: Bulge was 4-6 mm
C: Bulge was 6-7 mm
D: Bulge was over 7 mm Evaluation of Unwinding Property A feeding part was formed on one side with a first driver roller and a first free roller always remaining in contact therewith, and a take-up part was formed on the other side with a second driver roller and a second free roller always remaining in contact therewith and set horizontally separated from the feeding part by 20 cm. A package (3 kg in winding) similar to those described above was mounted to the first driver roller and unwound until the thickness of the wound fibers became 2 mm, taken up by the second driver roller. While the feeding speed of the polyurethane elastomer fibers from the first driver roller was fixed to 50 m/minute, the take-up speed to the second driver roller was gradually increased from 50 m/minute to forcibly unwind the polyurethane elastomer fibers from the package. During this forcible unwinding process, the take-up speed V (m/minute) at which the free motion of the polyurethane elastomer fibers between the feeding part and the take-up part became zero was measured and the unwinding property (%) was calculated as (V−50)×2 and evaluated as follows:

A: Unwinding property is less than 120% (There is no problem at all and unwinding can be stably effected)

B: Unwinding property is 120% or over and less than 160% (There is some resistance in drawing but there is no breakage and unwinding can be effected safely)

C: Unwinding property is 160% or over and less than 200% (There is resistance in drawing and there is also some breakage, there being some problem in the operation)

D: Unwinding property is 200% or over (The resistance is large in drawing and there are many occurrences of breakage, there being serious problems in the operation)

Unwinding property was also evaluated on packages that have been left for 6 months at 25° C.

Evaluation of Smoothness

A friction measuring device (SAMPLE FRICTION UNIT MODEL TB-1 (tradename) produced by Eiko Sokki Co., Ltd.) was used, a rough pin plated with chromium and having diameter of 1 cm was placed between its two free rollers such that and the contact angle of the polyurethane elastomer fibers drawn from the aforementioned package (1 kg in winding) with respect to this rough pin plated with chromium would be 90 degrees. An initial tension ($T_1$) of 5 g was applied on the inlet side under the condition of 60% RH at 25° C., and the secondary tension ($T_2$) on the outlet side was measured as the fibers were caused to run at the speed of 100 m/minute. The coefficient of friction was calculated as $(2/3.14)\times\ln(T_2/T_1)$ and evaluated as follows:

A: The coefficient of friction is 0.150 or over and less than 0.220

B: The coefficient of friction is 0.220 or over and less than 0.260

C: The coefficient of friction is 0.260 or over and less than 0.300

D: The coefficient of friction is 0.300 or over

Evaluation of Antistatic Property

As the aforementioned evaluation of smoothness was carried out, a static potential sensor (KSD-0103 (tradename) produced by Kasuga Electric Works, Ltd.) was set 1 cm below the rough pin plated with chromium and the generated potential was measured and evaluated as follows:

A: The generated potential was less than 50V (There was no problem at all and stable operation was possible)

B: The generated potential was 50V or more and less than 100V (There were some deviations in warping process but there was no problem and stable operation was possible)

C: The generated potential was 100V or more and less than 500V (There were deviations in warping process and there was problem although operation was possible)

D: The generated potential was 500V or more (There were significant deviations in warping process and the attachment of fluffs during the circular knitting process was also significant such that operation was not possible)

Evaluation of Adhesiveness

On a spunbond nonwoven fabric made of polypropylene, hot melt rubber type adhesive agent having styrenebutadien-styrene block copolymer heated and melted at 145° C. as principal component was uniformly applied by a roller and then it was cut to produce two cut pieces of size 40 mm×20 mm. The front edge part 10 mm of the polyurethane elastomer fibers of length 40 mm pulled out of the aforementioned package (1 kg in winding) was sandwiched between the adhesive-applied surfaces of these two cut pieces and compressed at processing temperature of 160° C. with a load of 9 g/cm$^2$ for 30 seconds to obtain a sample. The polypropylene spunbond nonwoven fabric portion of this sample was affixed to the upper sample holding part of a tension tester (Autograph AGS (tradename) produced by Shimadzu Corporation) and polyurethane elastomer fibers were affixed to the lower sample holding part and pulled at a speed of 100 mm/minute to measure the force necessary for pulling out the polyurethane elastic fibers from the polypropylene spunbond nonwoven fabric. The required force was evaluated as follows:

A: Required force was 35 g or more (Hot melt adhesion is strong and stable operation is possible)

B: Required force was 30 g or more and less than 35 g (Hot melt adhesion is practical and no problem occurs during operation)

C: Required force was 25 g or more and less than 30 g (There is some problem with hot melt adhesion and problem sometimes occurs during operation)

D: Required force was less than 25 g (Hot melt adhesion is weak there is a serious problem in operation)

TABLE 6

|  | Type | Attached amount (%) | Roll shape | Unwinding property | Unwinding property 6 months later | Smoothness | Antistatic property | Adhesiveness |
| --- | --- | --- | --- | --- | --- | --- | --- | --- |
| TE-46 | T-1 | 5 | A | A | A | A | A | A |
| TE-47 | T-2 | 5 | A | A | A | A | A | A |
| TE-48 | T-3 | 5 | A | A | A | A | A | A |
| TE-49 | T-4 | 2 | A | A | A | A | A | A |
| TE-50 | T-5 | 5 | A | A | A | A | A | A |
| TE-51 | T-6 | 5 | A | A | A | A | A | A |
| TE-52 | T-7 | 5 | A | A | A | A | A | A |
| TE-53 | T-8 | 6 | A | A | A | A | A | A |
| TE-54 | T-9 | 3 | A | A | A | A | A | A |
| TE-55 | T-10 | 5 | A | A | B | A | A | A |
| TE-56 | T-11 | 3 | A | A | B | A | A | A |
| TE-57 | T-12 | 5 | A | A | B | A | A | A |
| TE-58 | T-13 | 5 | A | A | B | A | A | A |
| TE-59 | T-14 | 5 | A | A | B | A | A | A |
| TE-60 | T-15 | 5 | A | A | B | A | A | A |

TABLE 6-continued

| Type | | Attached amount (%) | Roll shape | Unwinding property | Unwinding property 6 months later | Smoothness | Antistatic property | Adhesiveness |
|---|---|---|---|---|---|---|---|---|
| TE-61 | T-16 | 5 | A | A | B | A | A | B |
| TE-62 | T-17 | 3 | A | A | B | A | A | B |
| TE-63 | T-18 | 5 | A | A | B | A | A | B |
| TE-64 | T-19 | 5 | A | A | B | A | A | B |
| TE-65 | T-20 | 5 | A | A | B | A | A | B |
| TE-66 | T-21 | 5 | A | A | B | A | A | B |
| TE-67 | T-22 | 5 | A | B | B | A | A | A |
| TE-68 | T-23 | 5 | A | B | B | A | A | A |
| TE-69 | T-24 | 5 | A | B | B | A | A | A |
| TE-70 | T-25 | 5 | A | B | B | A | A | A |
| TE-71 | T-26 | 3 | A | B | B | A | A | A |
| TE-72 | T-27 | 3 | A | B | B | A | A | A |
| TE-73 | T-28 | 5 | A | B | B | A | A | B |
| TE-74 | T-29 | 5 | A | B | B | A | A | B |
| TE-75 | T-30 | 5 | A | B | B | A | A | B |
| TE-76 | T-31 | 5 | A | B | B | A | A | B |
| TE-77 | T-32 | 5 | A | B | B | A | A | B |
| TE-78 | T-33 | 3 | A | B | B | A | A | B |
| TE-79 | T-34 | 3 | A | B | B | A | A | B |
| TE-80 | T-35 | 3 | A | B | B | A | A | B |
| TE-81 | T-36 | 5 | A | B | B | A | A | B |
| TE-82 | T-37 | 5 | A | B | B | B | A | B |
| TE-83 | T-38 | 8 | B | B | B | A | A | B |
| TE-84 | T-39 | 5 | B | A | B | A | B | B |
| TE-85 | T-40 | 5 | B | B | B | B | B | A |
| TE-86 | T-41 | 5 | A | B | B | B | B | B |
| TE-87 | T-42 | 5 | B | B | B | B | B | B |
| TE-88 | T-43 | 5 | B | B | B | B | B | B |
| TE-89 | T-44 | 0.5 | B | B | B | B | B | B |
| TE-90 | T-45 | 5 | B | B | B | B | B | B |

TABLE 7

| Type | | Attached amount (%) | Roll shape | Unwinding property | Unwinding property 6 months later | Smoothness | Antistatic property | Adhesiveness |
|---|---|---|---|---|---|---|---|---|
| CE-14 | t-1 | 5 | C | B | B | A | C | D |
| CE-15 | t-2 | 5 | B | D | D | D | B | C |
| CE-16 | t-3 | 5 | B | B | B | D | B | D |
| CE-17 | t-4 | 5 | C | B | B | A | C | D |
| CE-18 | t-5 | 5 | C | C | D | B | B | B |
| CE-19 | t-6 | 5 | C | C | D | B | B | B |
| CE-20 | t-7 | 12 | D | A | B | D | B | D |
| CE-21 | t-8 | 5 | B | D | D | C | D | B |
| CE-22 | t-9 | 5 | D | B | B | D | B | D |
| CE-23 | t-10 | 5 | D | B | B | D | B | D |
| CE-24 | t-11 | 5 | C | C | D | B | B | A |
| CE-25 | t-12 | 5 | C | C | D | B | B | B |
| CE-26 | t-13 | 5 | B | D | D | C | C | B |

In Tables 6 and 7:
TE: Test Example
CE: Comparison Example
Type: Type of processing agent for polyurethane elastomer fibers As can be clearly understood from Tables 6 and 7, processing agents and methods according to this invention make it possible at the time of production of polyurethane elastomer fibers to obtain packages having superior roll shapes and unwinding property and to provide polyurethane elastomer fibers with superior smoothness, antistatic property and hot melt adhesive property. As a result, it is made possible to obtain polyurethane elastomer fibers of high quality under a condition of stable operation.

What is claimed is:

1. A processing agent for processing polyurethane elastomer fibers, said processing agent comprising a dispersion medium in an amount of 80 -99.99 mass % and a dispersoid in an amount of 0.01 - 20 mass % for a total of 100 mass % and having an average particle size of 0.1 - 500 μm as measured by a specified measurement method, wherein said dispersion medium is a mineral oil having a viscosity at 25° C. $2\times10^{-6}$ -$100\times10^{-6} m^2/s$;

wherein said dispersoid is a urethane compound shown by

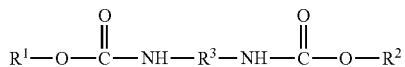

and is not determined to be a liquid at 25° C. by a specified determination method, $R^1$ and $R^2$ being each alkyl group with 14-38 carbon atoms or alkenyl group with 14-38 carbon atoms, $R^3$ being residual group obtained by removing all isocyanate groups from 4,4'-diphenylmethane diisocyanate, naphthalene diisocyanate,or tolylene diisocyanate, said specified determination method comprising the steps of filling a vertically maintained cylindrical glass test tube with inner diameter 30 mm and height 120 mm and having a flat bottom with the urethane compound to a height of 55 mm from the bottom inside an isothermal chamber at 25° C. and determining the urethane compound to be a liquid if it takes 90 seconds or less for the front of the moving edge of the urethane compound to pass a point 85 mm from the bottom of the test tube when the test tube is made horizontal, and the specified measurement method comprising the steps of diluting the processing agent for polyurethane elastomer fibers by using a mixture of polydimethyl siloxane and a mineral oil, both with viscosity of $10\times10^{-6} m^2/s$ at 25° C. at mass ratio of 1/1, to obtain a diluted liquid in which the dispersoid concentration of the processing agent for polyurethane elastomer fibers becomes 1000mg/L and measuring volume standard average particle diameter by using this diluted liquid with a laser diffraction particle size analyzer at liquid temperature of 25° C.

2. The processing agent of claim 1 wherein $R^1$ and $R^2$ are each alkyl group with 18-32 carbon atoms.

3. A method of processing polyurethane elastomer fibers, said method comprising the step of causing the processing agent of claim 1 to become adhered to said polyurethane elastomer fibers by a neat oiling method without diluting said processing agent during a spinning process of said polyurethane elastomer fibers at a rate of 0.1-1.0 pass % of said polyurethane elastomer fibers.

4. A method of processing polyurethane elastomer fibers, said method comprising the step of causing the processing agent of claim 2 to become adhered to said polyurethane elastomer fibers by a neat oiling method without diluting said processing agent during a spinning process of said polyurethane elastomer fibers at a rate of 0.1-1.0 pass % of said polyurethane elastomer fibers.

5. Polyurethane elastomer fibers that are obtained by the method of claim 3.

6. Polyurethane elastomer fibers that are obtained by the method of claim 4.

\* \* \* \* \*